United States Patent Office 3,431,956
Patented Mar. 11, 1969

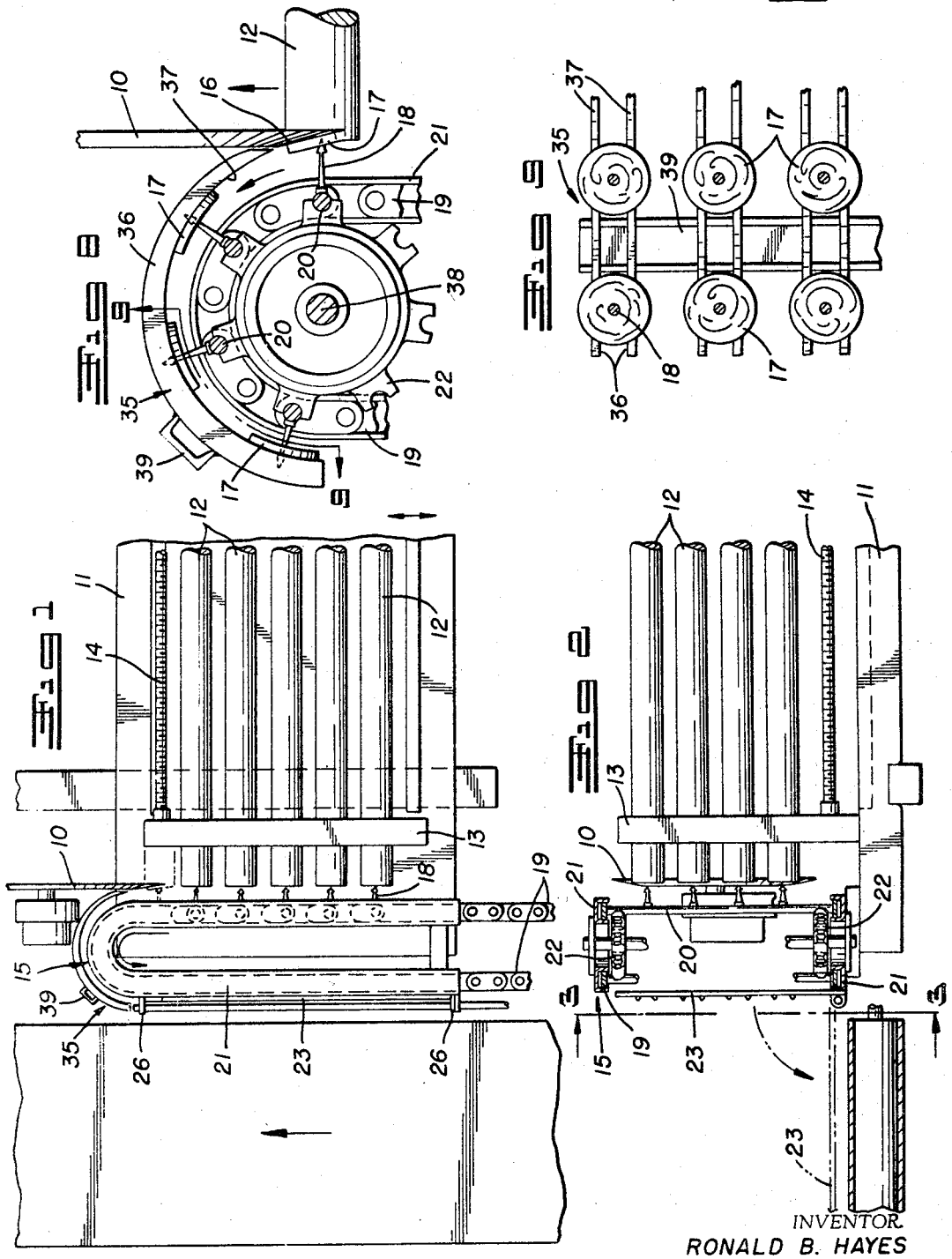

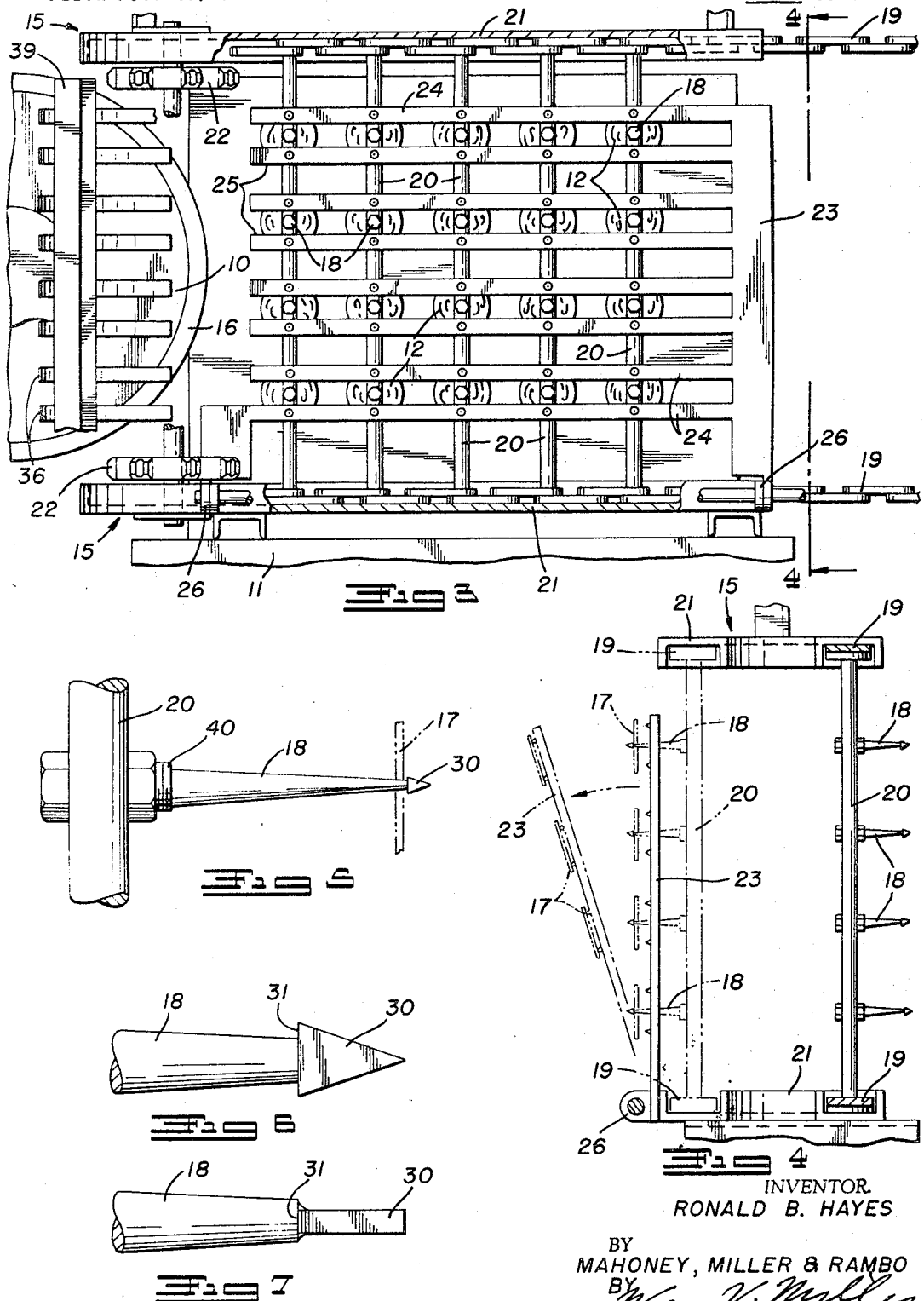

3,431,956
IMPALING NEEDLE ARRANGEMENT FOR A SAUSAGE SLICING MACHINE
Ronald B. Hayes, P.O. Box 338, Johnstown, Ohio 43031
Filed Feb. 20, 1967, Ser. No. 617,376
U.S. Cl. 146—94   4 Claims
Int. Cl. B26d 4/24; B65g 17/14

ABSTRACT OF THE DISCLOSURE

According to this invention, there is provided, in cooperation with a sausage slicing machine, an impaling needle arrangement for receiving the sausage slices as they are produced by a rotating slicing blade which cuts and displaces them successively from the sausage stick. The needle arrangement is such that it will receive and firmly retain the sausage slices, even if they are small and thin, and will carry them to a point of use where they may be removed from the needles of the structure.

---

In the past, it has been difficult to handle small sausage slices, as they are produced with present slicing machines. For example, it has been difficult to handle the small thin slices of pepperoni, as they are sliced successively from the pepperoni sticks, and to convey them to a point where they are applied to pizza dough. Plain needles have been used but the slices tend to drop off.

According to this invention, I provide a needle structure in association with the slicing blade or wheel of a slicing machine so that as the wedge-shaped blade successively slices the sausage stick, the slices are started onto the successive impaling needles and the needles are barbed needles so that when the slices are forced completely thereon, they will not tend to come off. Means is associated with the needle structure for gradually forcing the successive slices on the successive needles until they are held by the barbs. Then, when they are carried to the desired location, means is provided for stripping the sausage slices from the needles.

In the accompanying drawings, I have illustrated a preferred example of my invention and in these drawings:

FIGURE 1 is a fragmentary plan view of a slicing machine to which the needle arrangement of my invention has been applied.

FIGURE 2 is a fragmentary side elevational view of the machine.

FIGURE 3 is an end elevational view of the machine taken from the position indicated at line 3—3 of FIGURE 2.

FIGURE 4 is a sectional view taken along line 4—4 of FIGURE 3 and showing the needle stripping means.

FIGURE 5 is an enlarged view of one of the needles.

FIGURE 6 is a further enlarged view showing the barb of the needle at one of the flat sides thereof.

FIGURE 7 is a view at a right angle to FIGURE 6 or an edge view of the needle barb.

FIGURE 8 is an enlarged detailed plan view showing how the slicing wheel and the impaling needle arrangement cooperate.

FIGURE 9 is a vertical sectional view taken along line 9—9 of FIGURE 8.

With reference to the drawings, the sausage slicing machine to which my invention is applied is in its general structure like machines provided in the prior art. These machines include generally a positively-driven slicing disc or wheel 10 and a reciprocable carriage 11 for supporting a plurality of sticks 12 of the sausage with their axes horizontal. Suitable means 13 is provided for clamping the sausage sticks 12 to the carriage 11 with the sticks disposed in parallel relationship and with their ends projecting toward the vertical plane of the cutting disc 10. The axes of the sticks are disposed parallel to the axis of the disc 10 and suitable means is provided for reciprocating the carriage 11 at a right angle to the axis of the disc 10 so as to cause the projecting ends of the sausage sticks to be fed successively into cooperation with the cutting disc and then to be retracted to their original positions shown in FIGURES 1 and 2. As shown in FIGURES 1 and 2, the sausages are also disposed on the carriage at different levels in vertically spaced parallel horizontal planes. Also, suitable feeding means, indicated generally by the feed screws 14, is provided for advancing the sausage sticks laterally of the carriage in a direction parallel to the axis of the disc 10 to feed the sausage, step-by-step, relative to the plane of the cutting disc so that the disc will successively cut slices of the desired thickness from the sausage as the sausage is brought into cooperation with the disc by advancing the carriage 11 toward the disc.

The sausage slice impaling needle conveyor unit is indicated generally at 15 and is mounted in cooperation with the cutting disc 10 for receiving and impaling the slices of sausage successively cut from the sausage sticks 12 by the disc 10. This unit is, in its general nature, like those provided in prior art slicing machines. It will be noted in FIGURE 8 that the disc 10 has a knife-edge or wedge-shaped cutting edge 16 so that as a slice 17 is cut from the end of the sausage stick 12 it is forced outwardly. A needle 18 engages the slice even before it is completely severed from the stick. The needles 18 are supported so that they successively engage the slices 17 as they are severed from the various sticks.

The needles 18 are carried on an endless conveyor of the unit 15 which includes the upper and lower horizontally disposed endless chains 19. These chains are joined together by the vertical rods 20. The chains 19 are disposed in and travel around in the respective upper and lower guide tracks 21 which are suitably supported at proper levels on the frame of the machine. The rods 20 are spaced apart in accordance with the spacing of the vertical tiers of the sausage sticks 12 on the carriage 11 and the needles 18 are disposed on each rod 20 at levels corresponding to the levels or layers of the sausage sticks 12 on the carriage 11. The conveyor may be supported in the usual manner and is intermittently driven in timed relationship to the reciprocation of the carriage 11 by the usual means including the vertical spaced sprockets 22 which engage with the successive vertical rods 20.

The impaled slices may be stripped from the needles 18 by means of a stripping frame 23 which is supported along the outer runs of the chains 19 opposite the side where the cutting disc 10 is disposed. This frame is provided with a series of bifurcated fingers or forks 24 which are at levels corresponding to the levels of the needles 18. These fingers, as shown in FIGURE 3, have slots with open ends at 25 into which the projecting needles 18 will be successively advanced by the intermittent advance of the chains 19. The stripper frame 23 is hinged at 26 at its lower end for outward and downward swinging movement and this is accomplished in the usual way in timed relationship to the reciprocation of the carriage 11 and the intermittent advance of the chains 19.

The parts of the machine so far referred to are the usual parts provided on slicing machines of this type common in the art and a detailed description thereof is, therefore, not deemed necessary.

According to my invention, the impaling needles 18 are in the form of barbed or arrow-like needles. Each needle is, as shown in FIGURES 5 to 7, provided with a flat point 30 with laterally extending barbs or shoulders 31 at its rear side which tend to prevent outward displacement of a slice 17 of the sausage after it is forced inwardly a distance greater than the length of the point 30. To force the slices 17 over the points beyond the barbs, a guide and camming assembly 35 is provided in association with the needle-carrying conveyor unit 15, as shown best in FIGURES 8 and 9.

This assembly comprises a plurality of pairs of guidecams in the form of strips of metal 36 which have edges 37 directed toward the needle conveyor at its curved end adjacent the disc 10 where it passes around the axis 38 of the sprockets 22. These edges 37 are not concentric with the axis 38 but as they pass around the end of the conveyor, they gradually approach closer to that axis. The pairs of cam strips 36 are disposed at such levels that the respective sets of needles 18 at the various levels will be advanced therebetween as they approach the cutting disc 10 and pass on around the end of the conveyor unit 15, as indicated in FIGURE 9. Each of the strips 36 will extend from a point directly adjacent the disc 10 around the end of the conveyor to the opposite side thereof. The strips may be supported at the different levels by a vertical support 39 and since they are so supported and have the edges 37 eccentric relative to the axis 38, the slices 16, as they are severed from the sticks 12, will first be engaged by the successive needle points 30, and continued movement of the partially impaled slices around the curved end of the conveyor unit 15 will cause the edges 37 to exert an axial inward force on the slices and force them inwardly over the barbed ends of the needles. Obviously, the spacing of each pair of cam edges 37 will be substantially greater than the depth of each needle and substantially less than the diameter of each slice. The eccentricity of the edges 37 relative to the axis 38 will be sufficient to force the slices completely over the barbed points 30 and beyond the shoulders or barbs 31. The needles 18 are preferably axially adjustable on the rods 20, as indicated by the threaded connection 40 in FIGURE 5, so as to provide for adjustment of the extent of penetration of the needles through the slices 17.

Thus, with this improved needle-arrangement, the sausage slices will be successively impaled on the barbed needles and will not tend to pull off. To remove them, it is merely necessary to actuate the stripper 23, after the needles move into association therewith. The stripper fingers 24 will engage the inner sides of the slices and will force the slices beyond the barbs 31 and off the points 30.

Various advantages of my improved structure have been mentioned above and others will be apparent.

Having thus described this invention, what is claimed is:

1. In a slicing machine of the type described including means for supporting the article to be sliced in conjunction with a slicing disc, and a needle-carrying conveyor structure mounted in cooperation with the disc for receiving the slices as they are severed by the disc, said needle-carrying conveyor having a plurality of outwardly extending impaling needles carried thereon at successive positions, each of said needles being of the barbed type having a barbed point, and cam means extending from the disc to a remote point in cooperation with the conveyor for gradually forcing the slices into engagement with the successive needles and completely over the barbed points thereof.

2. The machine of claim 1 in which the needle-carrying conveyor is an endless conveyor which carries the needles around an axis at one end thereof, and which has opposed runs with the cutting disc adjacent the run at one side thereof, said cam means comprising cam surfaces for engaging the severed slices as they are moved by the needles around the curved end of the conveyor, said cam surfaces being eccentrically disposed relative to said axis so as to gradually force the severed slices inwardly over said barbed ends of the needles.

3. The machine of claim 2 wherein the needle ends are in the form of flat barbed points of predetermined length and the cam surfaces are so located that the needles will gradually move outwardly thereof with their barbs outwardly beyond said surfaces so that the slices will move completely on the needles beyond the barbs.

4. The machine of claim 3 including a stripper into which the slice-impaling needles will move, said stripper having fingers for engaging the slices at their inner sides, and means for moving the fingers outwardly relative to the barbed points of the needles to positively strip the slices therefrom.

References Cited
UNITED STATES PATENTS

| 2,095,043 | 10/1937 | Van Berkel | 146—94 |
| 2,834,388 | 5/1958 | Meyer | 146—94 |

W. GRAYDON ABERCROMBIE, *Primary Examiner.*